US007195198B2

(12) United States Patent
Boice et al.

(10) Patent No.: US 7,195,198 B2
(45) Date of Patent: Mar. 27, 2007

(54) HELICOPTER BLADE EMERGENCY DETACHMENT SYSTEM

(76) Inventors: William Spencer Boice, One Austell Way, Atlanta, GA (US) 30305; Jonathan Wilhelm Den Hartog, 1350 Old Mill Rd., Crozier, VA (US) 23039; Scott T. Wisniewski, 157 Cody St., Manchester, NH (US) 03109

( * ) Notice: Subject to any disclaimer, the term of this patent is extended or adjusted under 35 U.S.C. 154(b) by 0 days.

(21) Appl. No.: 11/211,923

(22) Filed: Aug. 25, 2005

(65) Prior Publication Data
US 2007/0048132 A1 Mar. 1, 2007

(51) Int. Cl.
*B64C 27/00* (2006.01)
(52) U.S. Cl. .................................... 244/17.11
(58) Field of Classification Search ............. 244/17.11, 244/17.23, 17.25
See application file for complete search history.

(56) References Cited

U.S. PATENT DOCUMENTS

| 3,229,931 | A | * | 1/1966 | Larsen ..................... | 244/17.11 |
| 3,778,008 | A | * | 12/1973 | Ingham et al. ............ | 244/17.11 |
| 3,912,200 | A | * | 10/1975 | Foral ....................... | 244/17.11 |
| 3,926,388 | A | * | 12/1975 | Johnson et al. .......... | 244/17.11 |

OTHER PUBLICATIONS

Lawrence J. Bement, Rotor Systems Research Aircraft Emergency Escape System, 1978, Proceedings from the 34th Annual National Forum of the American Helicopter Society, Washington, D.C., May 1978.
In-Flight Escape Systems for Helicopters Should be Developed to Prevent Fatalities, 1973, United States General Accounting Office, Nov. 10, 2003, <http://archive.gao.gov/f0202/094114.pdf>.
KA-50 Black Shark Attack Helicopter, Net Resources International Limited, Oct. 17, 2003, <http://www.airforce-technology.com/projects/ka50/>.
KA-52 Hokum B "Alligator", Razorworks, Oct. 16, 2003, <http://www.razorworks.com/enemyengaged/hokum/>.

* cited by examiner

*Primary Examiner*—Tien Dinh

(57) ABSTRACT

A method and system for a helicopter blade emergency detachment system that has an activator in the cockpit to initiate the system, an ignition train to provide the detonation signal, a transfer system at the base of the main rotor shaft to move the signal from the stationary helicopter to the rotating blades, and explosive charges located at the root of each main bearing-less rotor blade to separate the composite blade from the main rotor. These four components interact in the way described to enable the blades of the helicopter to be detached during an emergency, thus increasing the stability of the aircraft during a hard landing and/or allowing for the use of an occupant ejection seat or parachute while the helicopter is still in flight.

6 Claims, 3 Drawing Sheets

HELICOPTER BLADE EMERGENCY DETACHMENT SYSTEM

BACKGROUND OF THE INVENTION

1. Technical Field

The present invention relates in general to the field of helicopters, and in particular to helicopter main rotor blades. Still more particularly, the present invention relates to a method and system for jettisoning a helicopter's main rotor blades in the event of a power failure or other catastrophe.

2. Description of the Related Art

The helicopter has unique maneuvering capabilities that set it apart from any other type of aircraft. Whereas fixed wing aircraft depend on a high forward velocity for flight, helicopters are capable of a full range of motion including forward, backward, left, right, upward, and downward movements. Though lighter-than-air craft such as zeppelins and balloons may also exhibit this capability, the helicopter is more responsive and can move with far greater speed and precision in a wider range of conditions.

There is no widely adopted method of escape for helicopter occupants given a mid-flight emergency such as total engine failure. Helicopter pilots instead depend on autorotation, an emergency landing technique equivalent to power-off gliding in an airplane. However, there are numerous situations where autorotation is not possible. During these emergencies, the rotating main rotor blades prohibit in-flight egress (e.g., through the use of an ejection or similar personal parachute safety system) or delay escape upon landing.

SUMMARY OF THE INVENTION

In response to the shortcomings of the prior art system described, the present invention is thus directed to a method and system for detaching the main rotor blades in the event of a critical emergency. The system includes an activator in the cockpit to initiate the system; explosive charges located at a root of each main rotor blade; an ignition train to provide a detonation signal; and a transfer system at the base of a main rotor shaft.

Preferably, the activator in the helicopter's cockpit is dependant upon the design and layout of the helicopter cockpit and is a lever, switch, or button. This activator is independent of other systems and has its own redundancy, so as not to fail in the event of an emergency.

The explosive charges are bi-directional linear shaped charges that are placed inside the hollow composite blades for protection, and are designed to shear each rotor blade at its root.

The ignition train is designed and dimensioned for each helicopter in which the system is implemented, and provides a signal pathway between the activator and the explosive charges.

Each ignition train preferably has the following components and characteristics. First, the ignition train is made from detonating cord ("det cord"). Second, the ignition train has at least two sets of disarming interlocks: one near the cockpit and the other near the blades. Third, the ignition train has a manifold for splitting the detonation signal to each rotor blade. And finally, all detonating cords in the ignition train are in pairs to provide redundancy.

The transfer system is designed and dimensioned to be placed at the base of the main rotor shaft. The signal transfer occurs when a piston rises into a free space inside the transfer system, contacting a percussion primer, resulting in an ignition of a sequential strand of detonating cord. This mechanical activation ensures that the detonation signal will travel between the helicopter fuselage and the rotating main rotor blades.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
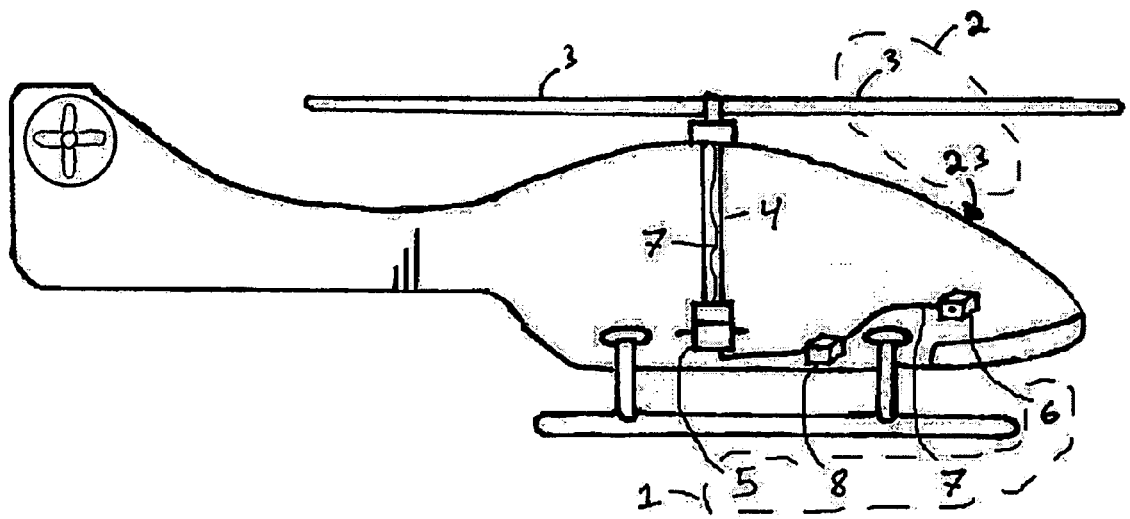
FIG. 1 depicts a cross-sectional view of a helicopter that has a helicopter blade emergency detachment system installed (but not yet activated)

With reference now to the figures, and in particular to FIG. 1, there is depicted a preferred embodiment of a helicopter blade emergency detachment system 1, shown in further detail in FIGS. 2–6, that includes a signal initiator 6 (preferably mounted in the cockpit of helicopter 2), a transfer system 5, an ignition train 22 (shown in FIG. 2), and linear shaped charges 12 (shown, inter alia, in FIG. 5) placed inside the blade 3.

The helicopter 2 includes a fuselage 23 and blades 3. While the fuselage can remain stationary during flight, the blades are constantly spinning around it and never come to a rest. This leads to the need for a transfer system 5 to enable the activation signal from the pilot to move between the two parts of the helicopter. However, before the transfer system can be used, the pilot must activate the helicopter blade emergency detachment system by pulling a lever, flicking a switch, or pushing a button on the signal initiator 6 which is a mechanical or electrical device that ignites one end of the detonating cord 7. Detonating cord 7 burns extremely fast and acts as a signal when it reaches other components of the ignition train 22.

Figure 3:
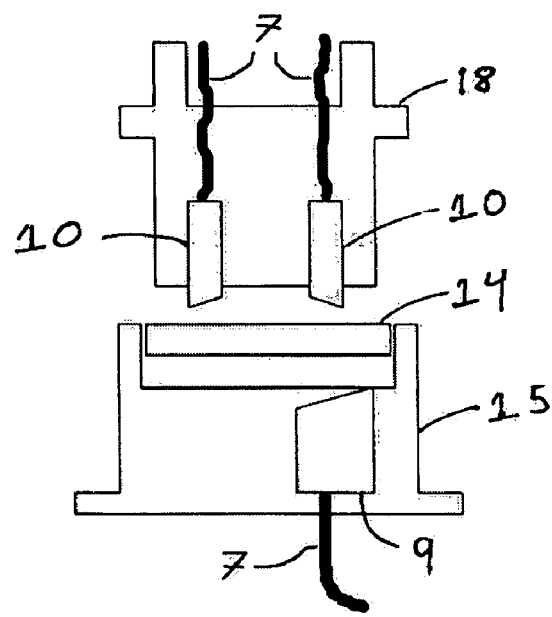
FIG. 3 is a cross-sectional view of a transfer system in the helicopter blade emergency detachment system.
Figure 4:
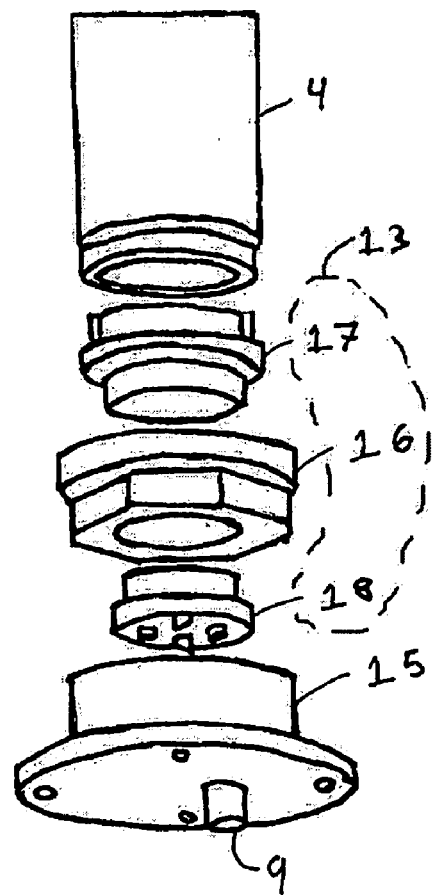
FIG. 4 depicts an exploded view of the transfer system, detached from a main rotor shaft, shown in FIG. 3.
Figure 5:
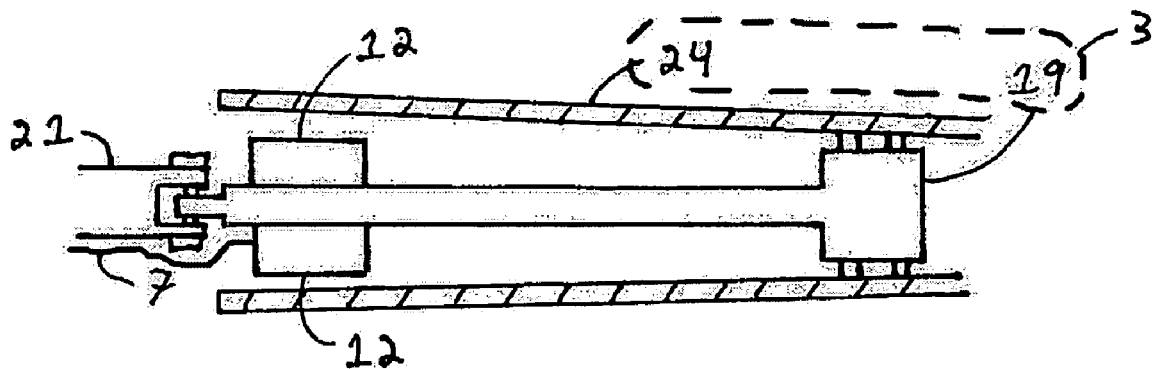
FIG. 5 illustrates a cross-sectional view of a composite helicopter blade with linear shaped charges installed around a blade flexbeam.
Figure 6:
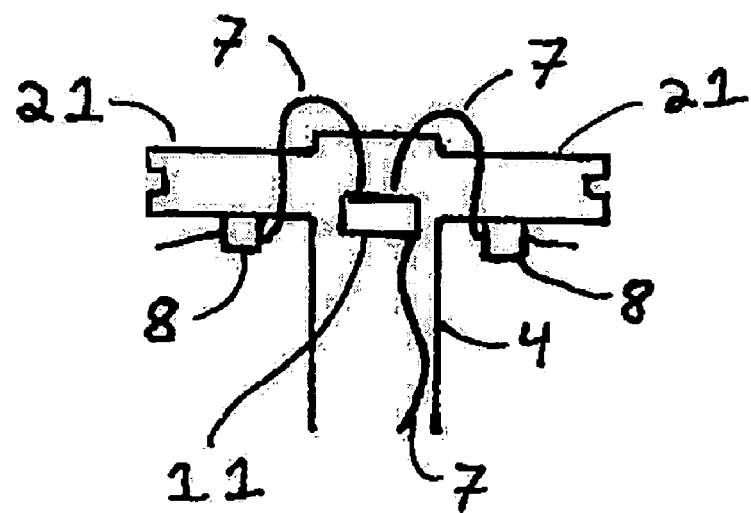
FIG. 6 depicts a cross-sectional view of a main rotor and a top of a main rotor shaft showing an orientation of a detonating cord along a main rotor shaft and out to rotor blades in accordance with a preferred embodiment of the present invention.

The signal is then carried to the transfer system 5, as shown in FIG. 3, where a small explosion causes a piston actuator 9 housed in the stator assembly 15 to extend into the free space between stator assembly 15 and rotor assembly 13 (as shown in FIG. 4). The piston actuator 9 will then contact percussion primers in cartridges 10, which are attached to the inner rotor 18 of the rotor assembly 13 (shown in FIGS. 3–4). Upon contact with the piston actuator 9, the percussion primers in cartridges 10 ignite the next string of detonating cord 7, which runs up the main rotor shaft 4, as shown in FIG. 1. At the top of the main rotor shaft 4 the detonating cord 7 reaches a manifold 11, as shown in FIG. 6, which splits the signal from one cord into two cords so that a pair of blades is detached at the same time to maintain the stability of the helicopter. These two signals then travel through the detonating cord 7 to the linear shaped charges 12 placed inside each blade 3, as shown in FIG. 5. When the signal reaches the linear shaped charges 12, they explode, shearing the blade flexbeam 19 and sleeve 24, thus allowing the blade 3 to detach from helicopter 2. Preferably, the linear shaped charges 12 (i.e., controlled explosive) are a cyclo-trimethylene-trinitramine (RDX) mixture. This provides the additional benefit of an easily controllable explosive mixture that provides efficient and reliable means to fully shear the blade flexbeam 19, thus resulting in the blade flexbeam 19 and its associated blade sleeve 24 (together making a blade 3) fully and quickly detaching from the rotor 21.

FIG. 4 shows additional detail of the transfer system 5. The transfer system 5 is held to the fuselage 23 by the stator assembly 15 which bolts to the transmission access panel (not shown) below the main rotor shaft 4. The inner rotor 18 connects to the main rotor shaft 4 by slotting into the outer rotor 17. That rotor assembly 13 (made up of thrust nut 16, outer rotor 17, and inner rotor 18) then slots into the main rotor shaft 4 and is held in place by the thrust nut 16. Between the stator assembly 15 and the rotor assembly 13 is an oil seal 14 to prevent transmission oil and debris from entering the transfer system 5 and activating the detonating cord 7 that runs up the main rotor shaft to the linear shaped charges 12 in the blades 3.

Figure 2:
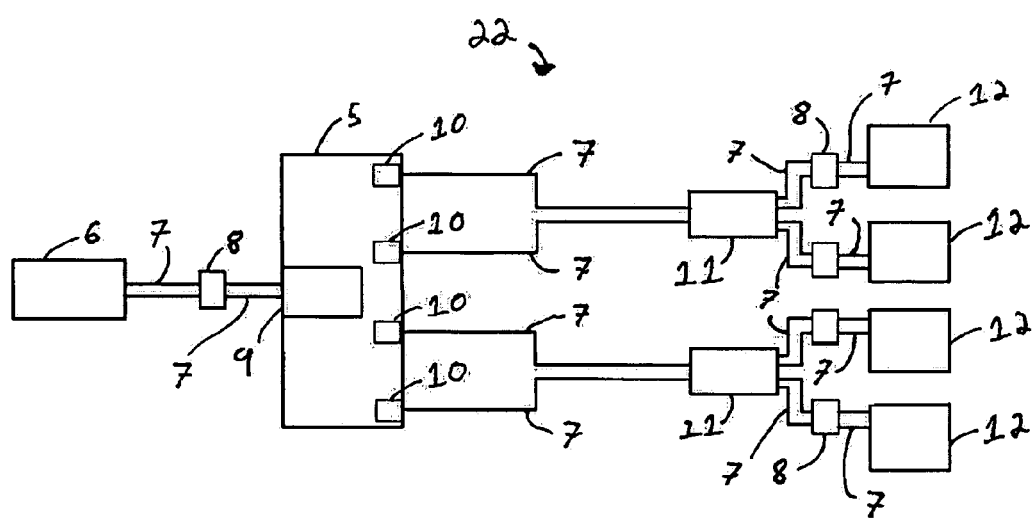
FIG. 2 is a schematic drawing of an ignition train in the helicopter blade emergency detachment system.

The ignition train 22, as shown in FIG. 2, connects the signal initiator 6 to linear shaped charges 12 located on the blade 3. The main components of ignition train 22 are the detonating cord 7 and the transfer system 5, which are discussed above. Another set of key components are the disarming interlocks 8, which are located between the signal initiator 6 and the transfer system 5, as shown in FIG. 1, and between the manifold 11 and the linear shaped charges 12 near the blades 3, as shown in FIG. 6. These disarming interlocks 8 provide a means of disabling the helicopter blade emergency detachment system 1 when the helicopter 2 is not in use. When a pin (not shown) is placed inside the disarming interlock 8, any signal traveling through the detonating cord 7 will be stopped at the disarming interlock 8, which prevents the accidental detonation of the linear shaped charges 12 during maintenance, storage of the helicopter, or other non-emergency situations.

The helicopter blade emergency detachment system 1 is preferably for use on bearing-less rotor 21 helicopters with composite blades 3. Linear shaped charges 12, as shown in FIG. 5, are wrapped around the blade flexbeam 19 but leave enough room for the blade sleeve 24 to flex normally during flight. Linear shaped charges 12 are unique in their bi-directional explosion which cuts through the blade flexbeam 19 and the blade sleeve 24, thus enabling both the blade sleeve 24 and flexbeam 19 to move away from the helicopter after detonation of linear shaped charges 12 due to their rotational momentum. Once the blades 3 are detached, the helicopter 2 provides clearance for in-flight escape systems such as ejection seats (not shown) or aircraft recovery systems such as large parachutes (not shown). Additionally, the absence of blades affords helicopter 2 much greater stability for a hard landing because blades 3 may have caused the helicopter to roll and create large amounts of flying debris upon impact. Further, when ditched into water, detachment of the main rotor blades of helicopter 2 permits the crew to exit a submerged fuselage and reach the surface of the water without danger of being struck by the rotating blades 3.

The present invention thus presents a novel method and system for using linear shaped charges inside the composite helicopter blades to detach the helicopter blades from the helicopter in the event of a catastrophe. The present invention does not compromise the structural integrity of the blade flexbeam since the blade flexbeam is not subjected to being filled with explosives or having milled shear lines. The presented helicopter blade emergency detachment system does not affect any structural component of the helicopter until activation when the blades are sheared. Additionally, the explosive is contained within the blade sleeve, thus concealing the system and offering protection against debris and the operating environment.

While the invention has been particularly shown and described with reference to a preferred embodiment, it will be understood by those skilled in the art that various changes in form and detail may be made therein without departing from the spirit and scope of the invention.

What is claimed is:

1. A helicopter blade emergency detachment system for a helicopter, the helicopter blade emergency detachment system comprising:
    at least one signal initiator;
    a first portion of an ignition train for transferring a detonation signal from the at least one signal initiator to a transfer system, wherein the transfer system transfers the detonation signal between a stator assembly and a rotor assembly through a use of pistons and percussion primers;
    a second portion of the ignition train for further propagating the detonation signal from the transfer system to rotor blades on a helicopter; and
    explosive charges that are detonated, by the detonation signal from the second portion of the ignition train, to detach the rotor blades by a controlled explosion, wherein each of the rotor blades includes a blade sleeve around a blade flexbeam, and wherein the explosive charges are packed inside the blade sleeve and around the blade flexbeam.

2. The helicopter blade emergency detachment system of claim 1, wherein the explosive charges are comprised of a cyclo-trimethylene-trinitramine (RDX) mixture.

3. The helicopter blade emergency detachment system of claim 1, wherein the explosive charges are bi-directional linear shaped charges.

4. A helicopter having a helicopter blade emergency detachment system, wherein the helicopter blade emergency detachment system comprises:
    at least one signal initiator that is mounted within a cockpit;
    a first portion of an ignition train for transferring a detonation signal from the at least one signal initiator in the cockpit to a transfer system;
    a transfer system transferring the detonation signal between a stator assembly and a rotor assembly in the transfer system through a use of pistons and percussion primers in cartridges;
    a second portion of the ignition train for further moving the detonation signal from the transfer system to rotor blades on a helicopter; and
    explosive charges that are detonated by the second portion of the ignition train to detach the rotor blades by a controlled explosion, wherein each of the rotor blades includes a blade sleeve around a blade flexbeam, and wherein the explosive charges are packed inside the blade sleeve and around the blade flexbeam.

5. The helicopter of claim 4, wherein the explosive charges are comprised of a cyclo-trimethylene-trinitramine (RDX) mixture.

6. The helicopter of claim 4, wherein the explosive charges are bi-directional linear shaped charges.

* * * * *